Patented Apr. 14, 1953

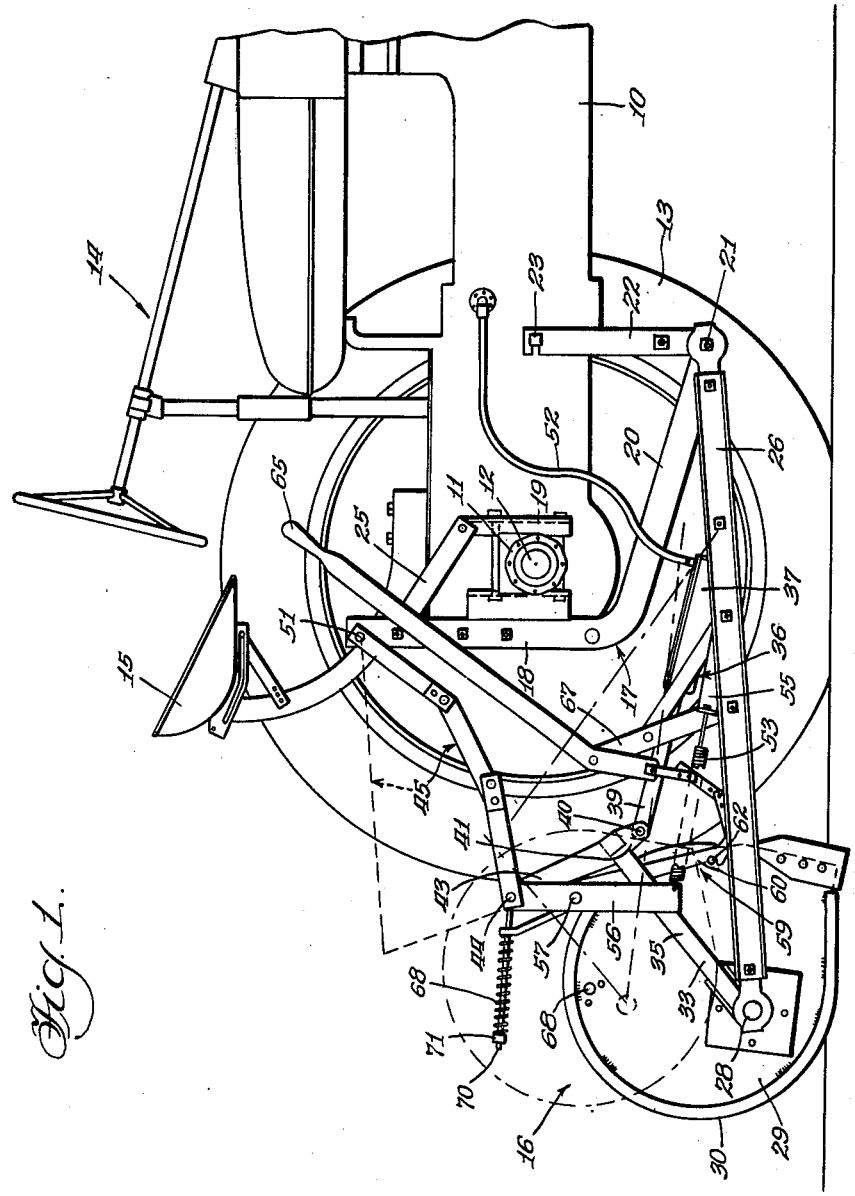

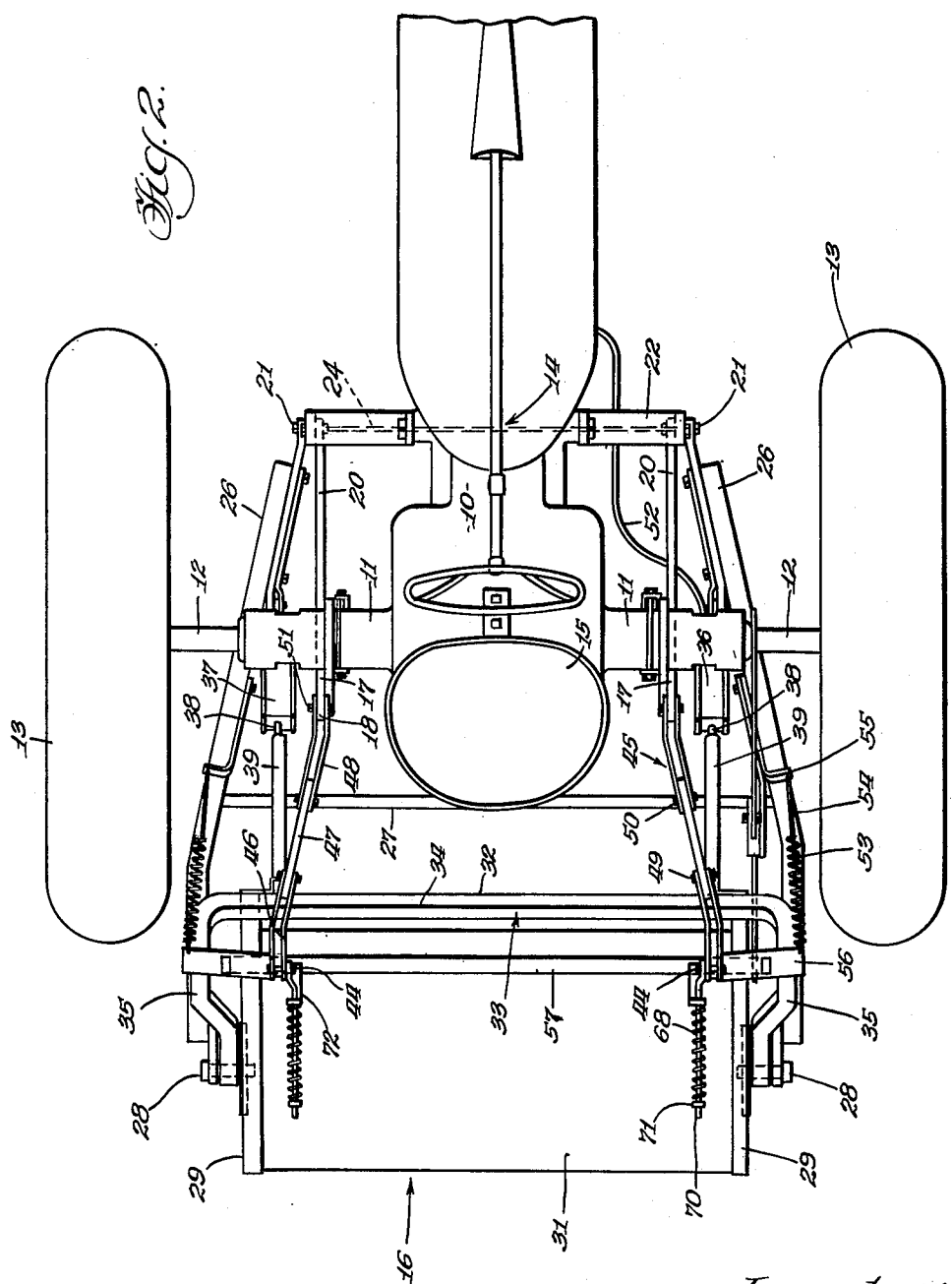

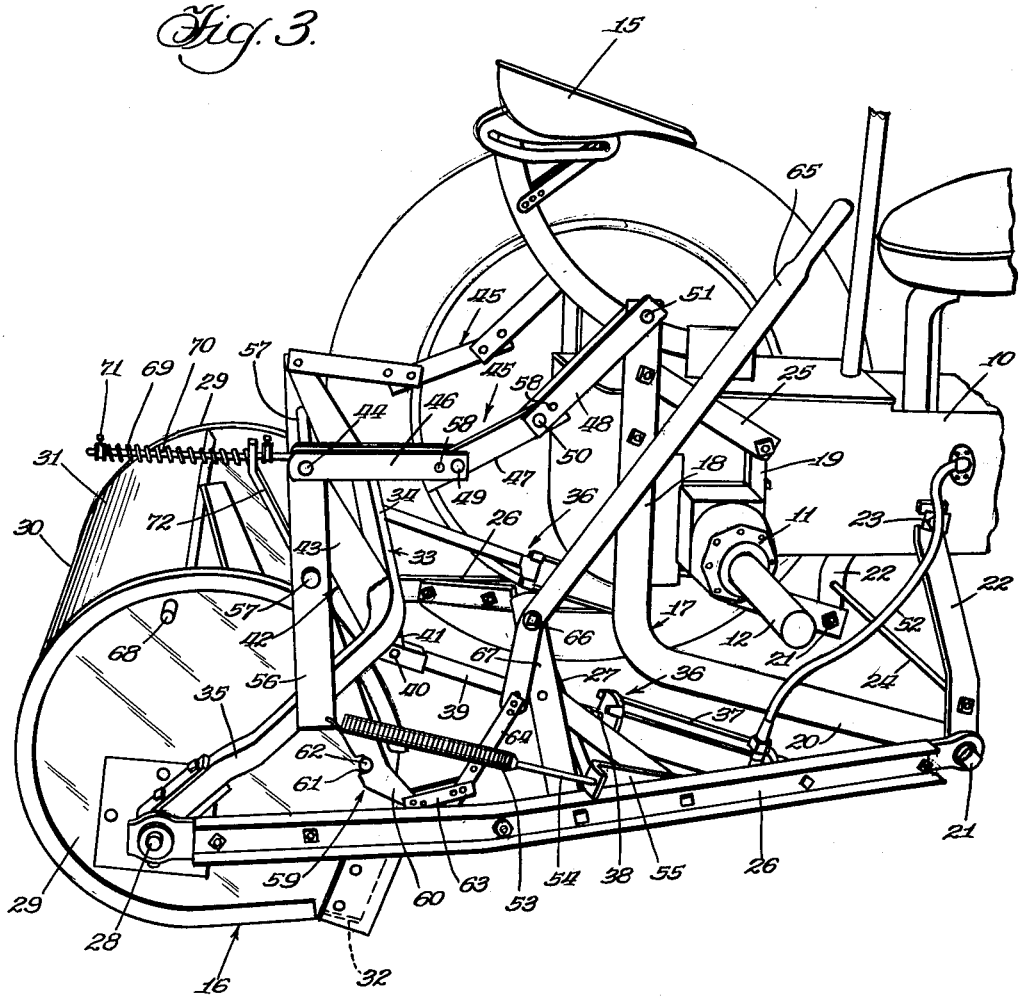

2,634,516

UNITED STATES PATENT OFFICE 2,634,516

SCOOP ATTACHMENT FOR TRACTORS

James Morkoski and Wayne G. Toland, Canton, Ill., assignors to International Harvester Company, a corporation of New Jersey Application December 23, 1948, Serial No. 66,902

3 Claims. (Cl. 37—126)

This invention relates to earth moving machinery and particularly to an implement of the revolving bowl type having an earth scraping blade combined with a receptacle capable of retaining and transporting dirt, and which can be dumped at will to release the dirt which has accumulated therein.

An object of the invention is to provide a novel tractor-mounted revolving bowl scraper or the like and means controllable from the tractor for raising and dumping the bowl to discharge the dirt therefrom.

Another object of the invention is to provide in a scoop or scraper connected to a tractor in draft-receiving relation, improved means for controlling the operation thereof.

Parallel link supports for scrapers and scoops of this type are desirable, particularly in lifting and transporting the implement. However, it has been customary in implements of this type to provide rigid parallel links for mounting the scoop upon the tractor. When the bowl was dropped to its operating position on the ground, the presence of the rigid upper link caused the earth penetrating blade to merely scrape the surface of the ground without penetration, or would penetrate too deeply causing the blade to engage the soil too aggressively. The result was that such pressure was exerted on the links as to lift the tractor rear drive wheels, causing them to lose traction. Then by trial and error the bowl had to be lifted again and lowered repeatedly until the blade edge properly engaged the soil.

It is well known that a plow bottom, mounted upon a beam connected at its forward end to the tractor to allow floating of the beam, seeks its own depth in the soil depending upon the position of the hitch point on the tractor. Another object of this invention is to provide a supporting structure for a bowl scraper or scoop which offers the advantages of the conventional parallel link structure while permitting the scoop when in operating position to seek its own depth of operation and avoid the disadvantages above mentioned.

Other objects and advantages of the invention will become clear from the following detailed description when read in conjunction with the accompanying drawings, wherein:

Fig. 1 is a view in side elevation showing the rear portion of a tractor with one wheel removed having mounted thereupon an implement embodying the features of the present invention;

Fig. 2 is a plan view of the structure shown in Fig. 1; and

Fig. 3 is an enlarged perspective view of the structure shown in Figs. 1 and 2.

Referring to the drawings, the implement of the present invention is mounted upon a tractor having a body 10 enclosing a power plant for the operation of the tractor and for providing power to adjust the position of implements mounted thereupon. The tractor is provided with a rear axle housing 11 enclosing an axle 12 upon which drive wheels 13 are mounted. The tractor also includes steering mechanism 14 and an operator's station 15.

The implement with which this invention is concerned is designated by the numeral 16 and is in the form of a revolving bowl scraper or scoop adapted to be mounted upon the rear portion of the tractor to be controlled therefrom and to be raised upon the tractor for transport. The scoop is connected to the tractor by mechanism including a pair of laterally spaced brackets 17 mounted upon the rear axle housing 11 of the tractor at opposite sides of the body thereof. Each bracket 17 comprises an upright portion 18 secured to the rear axle housing by a clamping structure 19 and having a downwardly and forwardly bent bracket portion 20 mounted upon a bolt 21 carried in the lower end of a strap 22 secured at its upper end by a bolt 23 to the side of the tractor body 10. A strap 22 is provided at each side of the tractor body, and at the lower ends these straps are braced by a transverse rod 24. An additional brace 25 is provided between the upright portion 18 of the bracket 17 and the clamp 19 for holding the bracket member rigid.

Pivotally mounted upon each of the bolts 21 for generally vertical swinging movement is the forward end of a longitudinally extending draft bar or arm 26 which comprises the lower link of a generally parallel link structure hereinafter to be referred to. The draft bars 26 at opposite sides of the tractor are connected by a brace 27.

The rear end of each of the bars is mounted upon a pivot pin 28 projecting laterally from the end plate 29 of a scoop 30. The end plates are connected by a transversely extending plate 31 semicircular in form and having formed at the lower forward edge thereof a sharpened transverse blade portion 32.

The ends of the scoop 30 are supported in a bail structure 33 having a transverse portion 34 extending above the body of the scoop 30 and downwardly extending end portions or arms 35, each arm having an aperture therein for the reception of the pin 28. The bail 33 and the bars 26 are journaled upon the pivot pin 28 so that the scoop 30 is capable of rotation with respect thereto about the axis of the pin 28. It should now be clear that the scoop 30 by virtue of its mounting at the ends of bars 26 is capable of vertical swinging movement along with the bail member 33.

Vertical movement of the scoop 30 between operating and transport positions is accomplished by a pair of hydraulic ram units 36 one at each side of the tractor body. Each ram unit 36 comprises a cylinder 37 anchored to a bolt carried at the forward end of arm or bar 26. Cylinder 37 is provided with a piston rod 38 slidable therein and receivable in a sleeve 39 which is bifurcated at its end and pivotally mounted upon a pin 40 carried upon the lower projecting portion 41 of an arm 42 affixed as by welding to the transverse portion 34 of the bail 33. An upwardly extending portion 43 of the arm 42 carries at its end a pin 44 which serves for the pivotal connection of one end of an articulated link structure 45 comprising three link members 46, 47, and 48. Link member 46 is connected at one end to the pin 44 and provided at its other end with a pin 49 upon which is pivoted one end of the link 47. The other end of link 47 is pivoted upon a pin 50 carried by the link part 48, the other end of which is pivoted upon a pin 51 carried at the upper end of bracket 17. An articulated link structure 45 is carried at each side of the tractor for connection between the arms 43 on the bail, and the brackets 17. These links are vertically spaced above the lower links consisting of the draft bars 26.

As pointed out before, it is desirable that the scoop 30 and the earth penetrating blade 32 thereof be allowed to seek and maintain the desired depth of operation in the soil depending on the position of the hitch point of the scoop as represented by the pin 21 to which the forward ends of the bars 26 are pivotally connected. This is accomplished by providing a construction which permits the scoop when in operating position to freely float vertically with respect to the ground, and this is accomplished by the articulated character of the upper link 45 which allows the parts 46, 47, and 48 thereof to pivot relative to each other and provide a flexible link. The cylinder and piston unit or ram 36 extends diagonally from a location near the pivot 44 of the link structure 45 with arm 43. Therefore, upon extension of the piston 38 in cylinder 37, the end of the piston abutting the end of sleeve 39 forces the scoop upwardly about the forward pivot 21. As the scoop moves upwardly toward transport position the parts 46, 47, and 48 of the articulated link structure 45 approach a position in alignment as indicated in dotted lines in Fig. 1, at which point these links become rigid and perform the normal function of parallel links, assisting in raising the implement and in holding it rigidly in transport position.

Fluid under pressure for operating the cylinder and piston unit 36 is supplied through a hose line 52 from a source on the tractor deriving power from the tractor power plant. Upon return of the scoop to operating position the fluid is released from the cylinder 37 to return to the supply source on the tractor, and the piston 38 is allowed to collapse therein. Collapse of the ram unit is accomplished by the weight of the implement against the piston of the cylinder and by a helper spring 53 connected at one end by a rod 54 with a bracket 55 secured to the draft bar 26. The other end of the spring is connected to the lower end of an arm 56 which is welded to bail arm 35 and arm 43 with rock-shaft 57 extending through 56 and pivoting at that point.

The depth to which the blade 32 of the scoop is allowed to penetrate may be adjusted by setting the pins 49 and 50 in one or more openings 58 provided in the link parts 46 and 48. The blade 32 may thus be pitched somewhat downwardly or upwardly so that the depth of soil penetrated thereby may be greater or less as desired to thus vary the relationship between the hitch point 21 and the cutting edge of the blade.

The bowl scraper of the present invention is revoluble about the pivots 28. The operating position of the implement is shown, for example, in Fig. 3, and upon advancement of the tractor with the blade penetrating the earth, the bowl of the scoop becomes filled with dirt, whereupon the ram unit 36 is operated to lift the scoop to transport position so that it can be moved to the location where the dirt is to be dumped.

It will be noted that the pivot axis of the bowl represented by the pins 28 is eccentrically placed near the periphery of the end plates 29, and the bowl is held against rotation by a latching mechanism 59 which, when released, permits the bowl to revolve and the earth to be dumped therefrom. This latching mechanism comprises a latch member 60 affixed at its upper end to the transverse rock shaft 57 and provided at its lower portion with a notch 61 adapted to receive a peg 62 projecting from the end plate 29 near the periphery thereof. When peg 62 is seated in the notch 61 the implement is in operating position as viewed, for example, in Fig. 3. The lower end of the latch member 60 is pivotally connected by a link 63 with a link 64 connected to the lower end of a hand-operated lever 65 pivotally mounted at 66 upon a bracket 67 secured to the right-hand draft bar 26. Lever arm 65 is in a convenient position adjacent the tractor operator's seat 15 to be operated therefrom. Upon movement of the lever 65 rearwardly, latch member 60 is moved forwardly out of engagement with the pin 62 and the bowl is able to revolve. If the scoop bowl is to be utilized for scraping or bulldozing, the latch member 60 is allowed to return to operating position to engage another peg 68 projecting from the end plate 29 adjacent the periphery thereof and circumferentially spaced from the peg 62. By maintaining the latch out of engagement with either of the pegs 62 or 68 and moving the tractor forwardly while the bowl rests upon the ground, the bowl will revolve until it returns to its original operating position.

The latch member 60 is biased to engage position with the pegs 62 or 68 by means of a spring 69 surrounding a rod 70 and abutting a collar 71 at one end of the rod and an arm 72 secured to the transverse rock shaft 57. The other end of rod 70 is mounted upon the pin 44. Spring 69, acting in compression, urges the arm 72 forwardly, rocking the shaft 57 and member 60 in a clockwise direction so that peg 62 is held in notch 61.

The operation of the earth scoop or scraper of the present invention is believed to be clear from the foregoing description. It should be understood, however, that the invention has been described in its preferred embodiment and that modifications may be made in the invention without departing from the spirit thereof or the scope of the appended claims.

What is claimed is:

1. In an earth scoop adapted for attachment to the rear of a tractor, laterally spaced pairs of vertically spaced generally parallel link structures connected at their forward ends to the tractor, a transversely extending scoop bowl having an earth penetrating blade carried at the rear ends of said link structures, the lower of said link structures serving as draft bars pivoted at their forward end to the tractor for vertical swinging movement of the scoop bowl between operating and transport positions, the upper of said link structures being flexible in the operating position of the scoop to accommodate free floating thereof and each comprising a plurality of articulated rigid parts, capable only of relative angular movement, movable into alined position upon raising the scoop to transport and resistant to extension and compression, and a power cylinder and piston unit connected between the forward portion of each of the lower draft bars and the scoop bowl and extending diagonally rearwardly and upwardly to raise the scoop to transport.

2. In an earth scoop adapted for attachment to the rear of a tractor, a pair of vertically spaced generally parallel link structures at each side of the tractor and pivotally connected at their forward ends to the tractor, a scoop bowl supporting structure connecting the rear ends of said link structures, a transverse scoop bowl pivotally carried by said supporting structure, a power cylinder and piston unit connected between the forward end of each of the lower link structures and the upper portion of the bowl supporting structure and extendible to raise the scoop to transport position, each of the upper of said link structures comprising a plurality of rigid articulated parts relatively pivotable in the operating position of the scoop to accommodate free vertical floating of the scoop, but alineable in transport position to form a rigid link resistant to extension and compression, said parts being capable only of relative angular movement, and resilient means urging the scoop to return to its operating position upon retraction of the piston in the cylinder.

3. In an earth scoop adapted for attachment to the rear of a tractor, a generally vertically extending scoop bowl supporting structure, a transverse scoop bowl pivotally carried by said supporting structure and having an earth penetrating blade, a longitudinally extending draft link connected to each end of the scoop and extending forwardly therefrom, means pivotally connecting the forward end of the draft links to the tractor for free vertical movement of the scoop, a power cylinder and piston unit connected diagonally between the forward end of each draft link and the upper portion of said scoop supporting structure and extendible to raise the scoop from operating to transport position, and articulated link means connected between the tractor and said supporting structure and generally parallel to said draft link, said articulated link means comprising a plurality of links pivotally connected on transverse axes for relative angular movement only about said pivots and flexed in the operating position of the scoop, said link means being movable by operation of the power cylinder and piston unit into alignment to form a rigid connection resistant to extension and compression in the transport position.

JAMES MORKOSKI.
WAYNE G. TOLAND.

References Cited in the file of this patent
UNITED STATES PATENTS

| Number | Name | Date |
|---|---|---|
| 2,273,875 | Livesey et al. | Feb. 24, 1942 |
| 2,350,327 | Ender | June 6, 1944 |
| 2,391,224 | Carter | Dec. 18, 1945 |
| 2,398,365 | Ellis | Apr. 16, 1946 |
| 2,465,831 | Arbs | Mar. 29, 1949 |
| 2,492,573 | Hearron | Dec. 27, 1949 |